(12) United States Patent
Bayard et al.

(10) Patent No.: US 11,311,964 B2
(45) Date of Patent: Apr. 26, 2022

(54) INTERNALLY COOLED VALVE HAVING A VALVE BOTTOM, AND METHOD FOR THE PRODUCTION THEREOF

(71) Applicant: FEDERAL-MOGUL VALVETRAIN GMBH, Barsinghausen (DE)

(72) Inventors: Guido Bayard, Dortmund (DE); Stefan Kellerman, Barsinghausen (DE); Antonius Wolking, Barsinghausen (DE); Luthfi Arief, Hannover (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 14 days.

(21) Appl. No.: 16/767,276

(22) PCT Filed: Aug. 7, 2018

(86) PCT No.: PCT/EP2018/071315
§ 371 (c)(1),
(2) Date: May 27, 2020

(87) PCT Pub. No.: WO2019/101374
PCT Pub. Date: May 31, 2019

(65) Prior Publication Data
US 2021/0086292 A1    Mar. 25, 2021

(30) Foreign Application Priority Data
Nov. 27, 2017    (DE) ................... 10 2017 127 986.5

(51) Int. Cl.
*F01L 3/02*    (2006.01)
*F01L 3/20*    (2006.01)
(Continued)

(52) U.S. Cl.
CPC .............. *B23K 20/129* (2013.01); *B21K 1/20* (2013.01); *F01L 3/14* (2013.01); *F01P 3/14* (2013.01); *B22F 3/225* (2013.01); *F01L 2303/00* (2020.05)

(58) Field of Classification Search
CPC . F01L 2303/00; F01L 3/02; F01L 3/20; F01L 3/18
See application file for complete search history.

(56) References Cited

U.S. PATENT DOCUMENTS 2,136,690 A  * 11/1938  Jardine ..................... F01L 3/04
                                                        123/188.8
2,609,576 A  *  9/1952  Roush ....................... B22C 7/02
                                                        164/30
(Continued)

FOREIGN PATENT DOCUMENTS

DE    102015116009 B3    1/2017
DE    102015220891 A1    4/2017

OTHER PUBLICATIONS

International Search Report, dated Jan. 25, 2019 (PCT/EP2018/071315).

*Primary Examiner* — Long T Tran
(74) *Attorney, Agent, or Firm* — Robert L. Stearns; Dickinson Wright, PLLC

(57) ABSTRACT

A method for manufacturing an internally cooled valve (2), includes providing a valve body (4) having a valve stem (6) that ends in a valve head (8). The valve body (4) has a cavity (10) that is open toward the valve head (8) and with a valve base element (12) by friction welding the valve base element (12) to the valve head (8). The valve bottom element (12) is preferably a sintered component.

10 Claims, 3 Drawing Sheets

Figure 1:
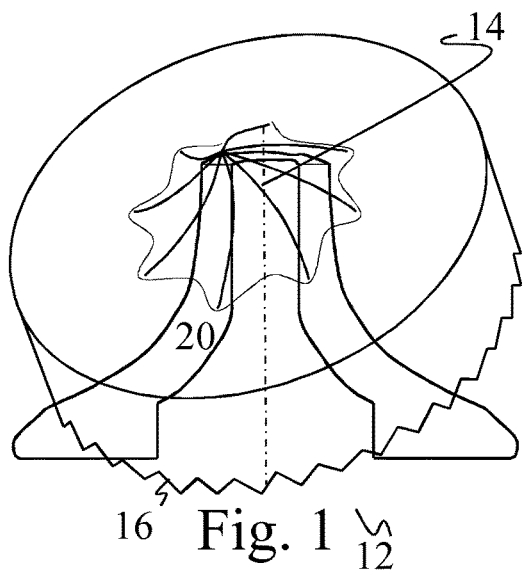

(51) Int. Cl.
    *B23K 20/12*     (2006.01)
    *B21K 1/20*      (2006.01)
    *F01L 3/14*      (2006.01)
    *F01P 3/14*      (2006.01)
    *B22F 3/22*      (2006.01)

(56) References Cited

U.S. PATENT DOCUMENTS

| | | | | |
|---|---|---|---|---|
| 5,503,122 | A * | 4/1996 | Ritland | C04B 41/5127 |
| | | | | 123/188.3 |
| 5,769,037 | A * | 6/1998 | Ohtsubo | F01L 3/14 |
| | | | | 123/188.9 |
| 5,792,402 | A * | 8/1998 | Rivers | F01L 3/02 |
| | | | | 156/148 |
| 5,934,648 | A * | 8/1999 | Rivers | F01L 3/02 |
| | | | | 251/368 |
| 7,862,007 | B2 * | 1/2011 | Schlegl | F01L 3/20 |
| | | | | 251/356 |
| 2003/0015570 | A1 | 1/2003 | Hirose et al. | |
| 2005/0076875 | A1 * | 4/2005 | Hora | F01L 3/02 |
| | | | | 123/188.3 |
| 2006/0005792 | A1 | 1/2006 | Bosler et al. | |
| 2007/0125976 | A1 * | 6/2007 | Stark | F01L 3/20 |
| | | | | 251/356 |
| 2009/0282675 | A1 | 11/2009 | Rozario et al. | |
| 2015/0292640 | A1 * | 10/2015 | Yokoyama | C23C 8/36 |
| | | | | 251/318 |
| 2016/0326919 | A1 * | 11/2016 | Ikemi | F01L 3/18 |
| 2018/0274401 | A1 | 9/2018 | Schober et al. | |
| 2018/0304344 | A1 | 10/2018 | Kellermann | |

* cited by examiner

INTERNALLY COOLED VALVE HAVING A VALVE BOTTOM, AND METHOD FOR THE PRODUCTION THEREOF

Background

1. Technical Field

The present invention relates to an internally cooled valve having a valve base that is inserted by friction welding.

2. Related Art

Thus far, various methods have been used for manufacturing hollow internally cooled valves for internal combustion engines. It is known to close a valve stem by friction welding. It is likewise known to insert a valve base in order to close a cavity in an internally cooled valve. Traditionally, for an installed valve the valve base is joined to the valve head by electron beam welding or laser welding. However, there are also other options for closing a cavity in an internally cooled valve, for example by closing a borehole in a valve stem.

It is desirable to have a method with which internally cooled valves, in particular having a hollow valve head, so-called hollow head valves, may be easily and cost-effectively manufactured.

The present invention relates to a method for manufacturing an internally cooled valve whose valve base has been joined to the valve head by friction welding, and a valve that is manufactured using this method.

According to a first aspect, a method for manufacturing an internally cooled valve is provided. The method comprises providing a valve body having a valve stem that ends in a valve head, wherein the valve body has a cavity that is open toward the valve head, providing a valve base element, and closing the cavity with the valve base element by friction welding the valve base element to the valve head. The valve base element has a diameter that is smaller than that of the valve head. The cavity that opens toward the valve base allows relatively simple manufacture of an internally cooled valve with a large cavity in the valve head, since an opening at the valve base may be designed to be almost as large as a valve disk diameter.

Previous joining methods such as electron beam welding, laser welding, or the like have significant disadvantages with regard to the finished material properties. In contrast, a friction welding operation may allow a high material density and a uniform structure or a relatively uniform structure transition.

For friction welding, one aspect relates to transmission of the torque necessary for the friction welding, which in the present case is very unfavorable, since the valve stem to which the valve may be clamped is much thinner than the diameter of the resulting friction weld seam. Thus, there may be a risk of the valve disk twisting off from the valve stem during the friction welding. This must be taken into account in the design of the friction welding parameters.

To optimize the process parameters of the method, it is also possible to optimize contact of the friction partners in order to carry out welding in both the axial direction and the radial direction. The valve base element to be welded should be welded here not only in an axial direction, but also in a radial direction, for which reason there is much less information, based on experience, compared to pure friction welding in the axial direction.

In one exemplary embodiment of the method, the friction welding is carried out as inductive friction welding. This embodiment allows the friction welding to be carried out with lower torque, which in particular may allow the valve body to be clamped to the valve stem during the welding to the valve base element, without the valve stem being sheared off by torsional forces.

Another exemplary embodiment of the method further comprises the cavity being at least partially filled with a coolant such as sodium or a coolant containing sodium, before the cavity is closed by friction welding. Thus, after the opening is closed, the valve does not have to be opened, filled, and closed again at the bottom of the valve disk. For this purpose, the sodium should be filled into the valve stem, and the valve stem should preferably be clamped by a cooled chuck or a cooled collet.

In an additional preferred exemplary embodiment of the method, the valve base element and/or the valve body have/has an engagement structure. The valve base element and/or the valve body may be centrally clamped by the engagement structure. In addition, the engagement structure may be designed in such a way that it allows increased torque transmission to the valve base element and/or the valve body. In particular, a central borehole is provided on the valve base element. The valve base element may also be provided with flank toothing that may be brought into engagement with corresponding toothing on a drive element to allow the torque to be transmitted during the friction welding. The toothing extends in the circumferential direction, and the amplitude of the toothing extends in the axial direction. The flank toothing may be designed as zigzag toothing or as sawtooth toothing to allow large torques to be transmitted. It is likewise possible to design the engagement structure as a prism having 3, 4, 5, or 6 corners to allow clamping of the engagement structure in a jaw chuck. In addition, the rear side of the valve disk may be provided with an engagement structure or entrainment structure that allows a higher torque to be transmitted to the valve disk than would be possible with the stem alone. In addition, an introduction of force at the edge of the valve disk appears to be problematic, since likewise only a relatively low torque can be transmitted due to the small axial width of the valve disk edge. The engagement structures on the rear side of the valve disk and/or on the valve base element make it possible to carry out friction welding in the first place.

In another exemplary embodiment of the method, the method comprises removal and/or ablation of the engagement structure. This may be achieved by grinding, milling, or other machining or nonmachining methods. At least a portion of the engagement structure is removed here. A portion of the engagement structure may remain on the valve disk and be used as cooling ribs, for example.

Another exemplary embodiment of the method uses a valve base element and a valve body having a welding surface contour, which in a friction welding operation produces a weld expulsion in the cavity in the form of a (circumferential) cooling rib. During friction welding, a weld expulsion that exits laterally from a weld gap generally occurs. Since it is expected that a weld discharge will also occur on the side of the cavity, the welding contour and the other friction welding parameters may be selected in such a way that the weld discharge that extends into the cavity has the shape of a circumferential cooling rib in order to improve heat transfer from the valve base or the edge of the valve disk to the coolant. The shape of the resulting weld expulsion may be influenced by the shape of the particular welding surface contours and the form of the friction welding parameters.

In another embodiment of the method, the method further comprises ablation or removal of an outer weld expulsion. A weld expulsion on an outer side of the valve or on the outside of the valve base may be removed after the friction welding. It is also provided to remove an outer friction weld expulsion after the friction welding, using machining or nonmachining processes.

Another embodiment of the method further comprises producing a valve base element by sintering from a valve base element green compact or brown compact. A novel technology is applied to produce the valve base element. By using sintered materials, it has become easier to produce cooling ribs or other structures, for example to influence coolant flow in the cavity. All design and configuration parameters may be easily implemented during the sintering, since during production of a green compact or brown compact the material does not yet have the high strength that is required for subsequent use and operation.

In one embodiment of the method, the valve base element green compact or brown compact is produced by pressing. In one preferred embodiment of the method, the valve base element green compact or brown compact is produced by metal powder injection molding. These methods allow quick, simple production of valve base element green compacts or brown compacts without the need for substantial machining effort. For the first time, it is possible here to quickly and efficiently produce a valve base element having a cooling or cooling liquid guide structure and an engagement structure without the forming steps and machining usually required. It is further provided to remove a binder from a valve base element green compact by thermal or chemical debinding, and to convert it to a brown compact before the brown compact is sintered by sintering to form the final valve base element. It is likewise possible to regard the thermal debinding as a method step of the sintering, the green compact being heated so that thermal debinding takes place before the actual sintering.

According to a further aspect of the present invention, a method is provided for producing a valve base element by metal powder injection molding or pressing of a valve base element green compact or brown compact and subsequent sintering. The valve base element is preferably produced by sintering technology, using metal powder injection molding for producing a valve base element green compact with subsequent debinding, followed by sintering. The valve base element thus obtained preferably has an engagement structure on which the valve base element may be connected to a valve body in a friction welding method.

According to a further aspect of the present invention, an internally cooled valve is provided that has been manufactured using one of the methods described above. The valve includes a valve body having a valve head and a valve stem, wherein a cavity that extends into the valve head is situated in the valve body, wherein the cavity is closed by a valve base that is joined to the valve head by friction welding. The type of joining may be determined by the weld expulsion in the cavity that is typical for friction welding, also on a finished valve, in which the valve is cut in the axial direction, for example.

In one embodiment of the internally cooled valve, the valve has a friction weld expulsion having the shape of a cooling rib on an inner side of the cavity. The cooling rib in the valve head allows improved heat transfer from the valve head to the coolant. The cooling rib or the two cooling ribs, which may occur in a friction welding operation, extend(s) from a preceding weld gap into the cavity.

In an additional exemplary embodiment of the internally cooled valve, the valve base element is provided with a cooling rib structure and/or flow-influencing structure on a surface facing the cavity. The inner surface of the valve base element may be provided with a structure that may facilitate improved cooling or improved heat transfer to the coolant, even outside a cooling rib that is produced by a weld expulsion. In addition to or instead of cooling ribs, a flow guide structure such as a stream conductor cone or a stream bypass volute may be mounted on the valve base element in order to distribute a coolant, flowing from the valve stem, in the cavity in the valve head.

In one exemplary embodiment of the internally cooled valve, the valve base element is produced by sintering and joined to the valve body by friction welding, and an engagement element, on which the sintered valve base element has been held during the friction welding to the valve body, is at least partially removed.

THE DRAWINGS

The invention is explained in greater detail below with reference to schematic figures.

Figure 2:
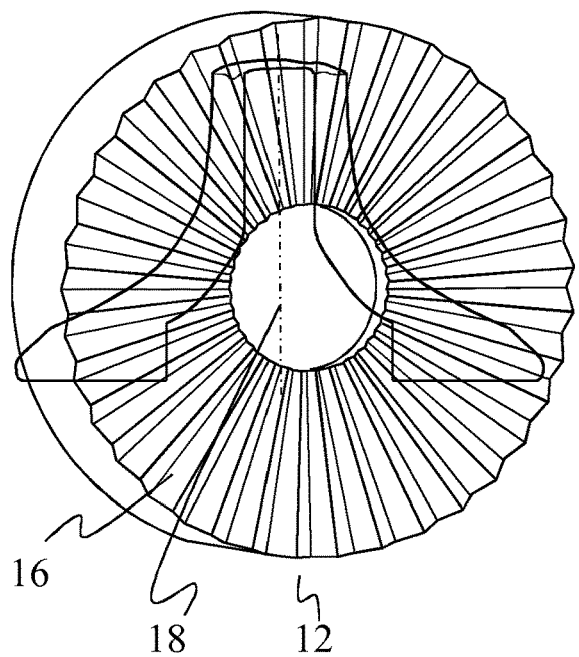

FIGS. 1 and 2 show a perspective view of a valve base element.

Figure 3:
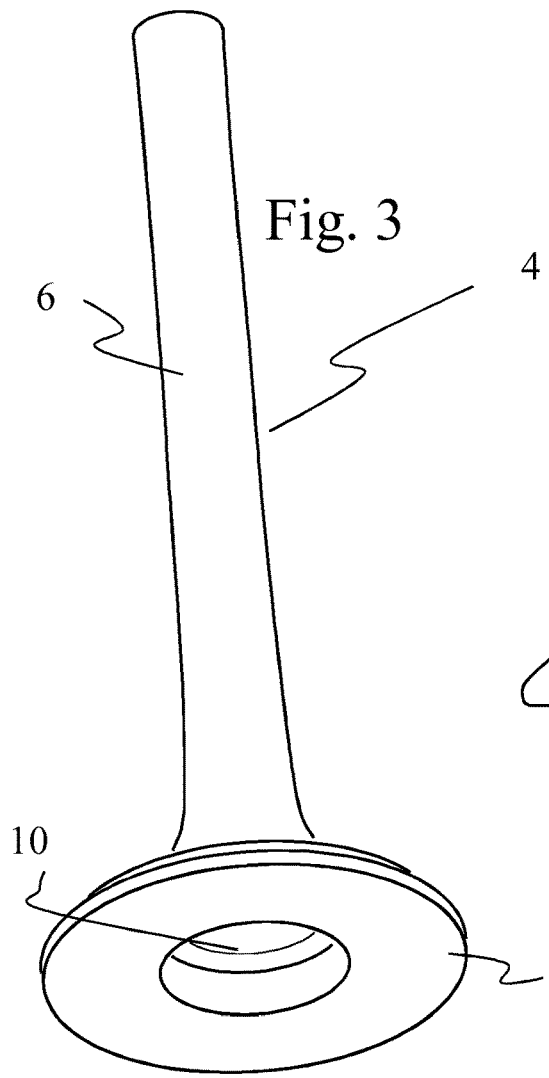
Figure 4:
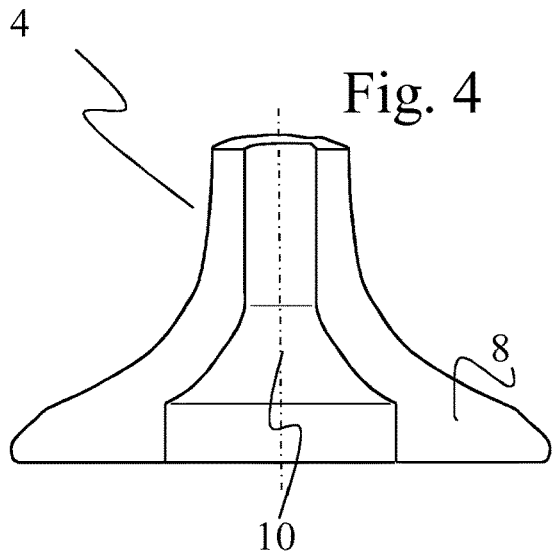

FIGS. 3 and 4 respectively illustrate a perspective view and a sectional view of a valve body.

Figure 5:
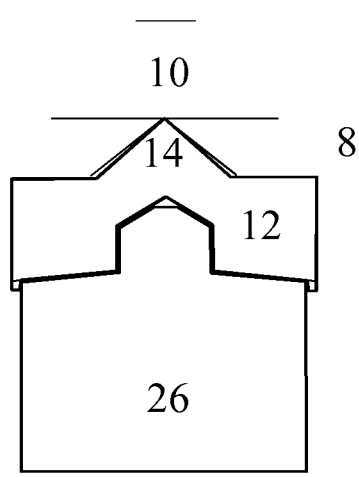
Figure 6:
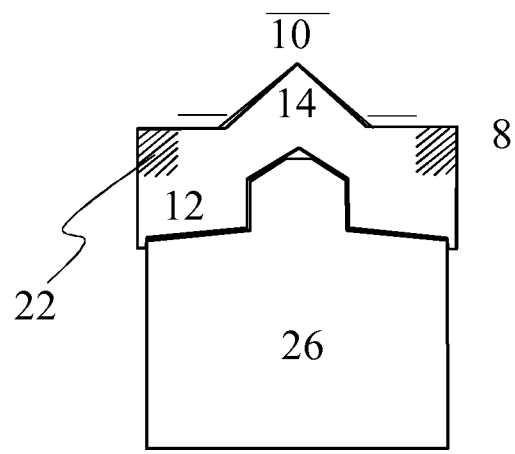

FIGS. 5 and 6 respectively show a beginning and an end of a friction welding operation according to the invention.

Figure 7:
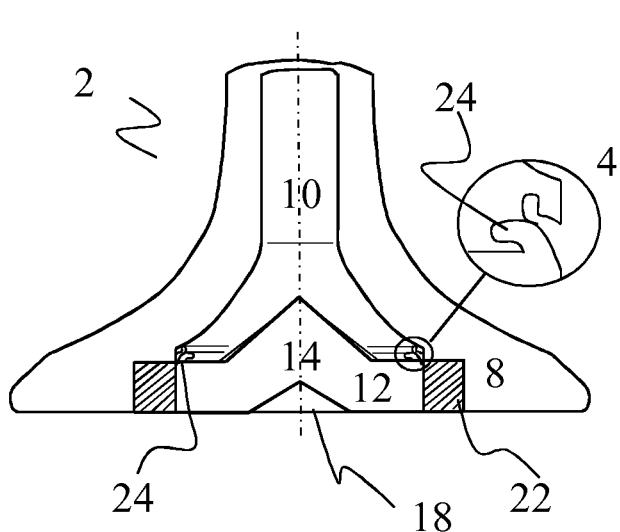
Figure 8:
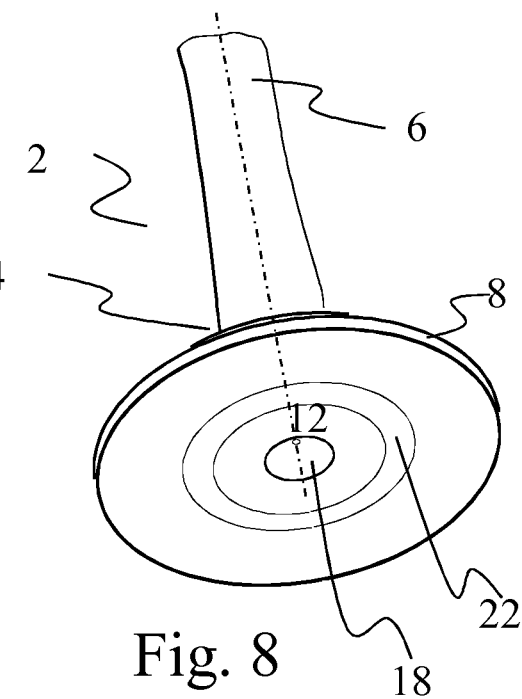

FIGS. 7 and 8 respectively illustrate a partial sectional view and a partial perspective view of a valve according to the invention.

Figure 9:
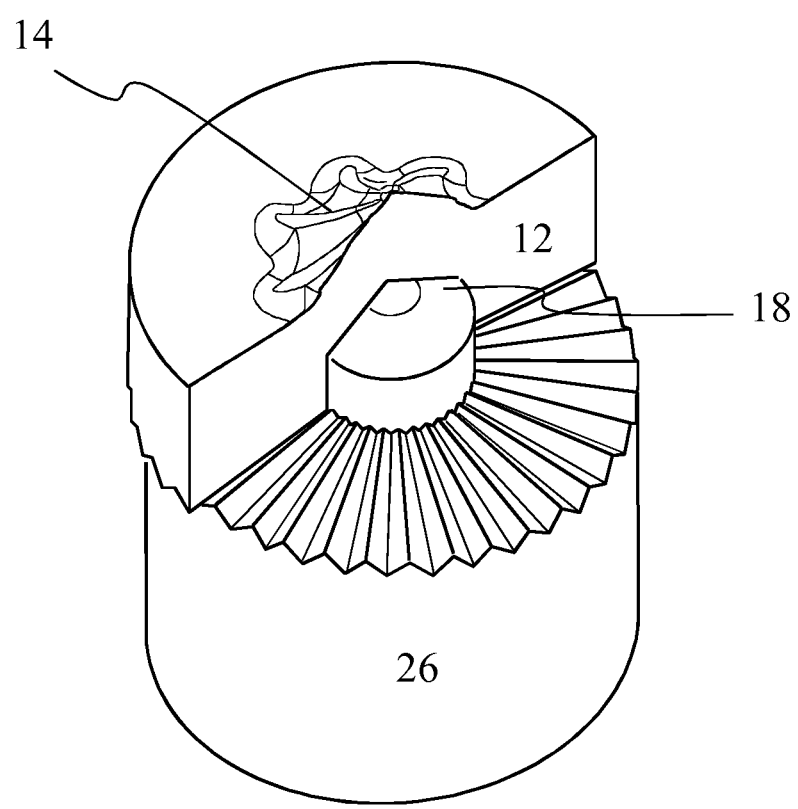

FIG. 9 illustrates a valve base element that is mounted on a friction welding mandrel.

DETAILED DESCRIPTION

Identical or similar reference numerals are used in the description and in the figures to denote identical or similar elements or components.

FIG. 1 shows a perspective view of a valve base element 12. In the view in FIG. 1, a subsequent inner side 20 of the valve base element 12 and a cooling rib structure/flow-influencing structure 14 are illustrated, which are intended to uniformly distribute a coolant, flowing from above from a hollow valve stem, in the valve head. An engagement structure 16 or torque transmission element via which a torque may be transmitted to the valve base element 12 during a friction welding operation is apparent at the bottom of the valve base element 12. In a departure from the illustration, a sawtooth profile may also be used to allow even better torque transmission, even with low axial pressing or friction welding pressures.

FIG. 2 shows the valve base element 12 from FIG. 1 in a bottom view, the engagement structure 18 or the torque transmission element being apparent here as flank toothing. In the center, a borehole as a centering element 18 is situated on a bottom side of the valve base element 12.

FIGS. 3 and 4 respectively illustrate a perspective view and a sectional view of a valve body. The valve bodies 4 each include a valve stem 6 and a valve disk 8. A cavity 10 for a coolant such as sodium or a sodium-containing material that is liquid at operating temperature opens from the side of the valve disk 8. Due to the opening at the valve base, on the one hand a structurally stable valve may be very easily manufactured, and on the other hand a cavity that extends over a large area of a diameter of the valve head 8 may be very easily produced in the valve body.

FIGS. 5 and 6 respectively show a beginning and an end of a friction welding operation according to the invention. In FIG. 5, the valve base element 12 together with the cooling rib structure/flow-influencing structure 14, facing the cavity 10 of the valve body 4, is attached to the valve body. The valve base element 12 is fixed or mounted on a friction welding mandrel 24, while the valve body 4 itself is clamped to the valve stem 6. At the beginning of the method, the friction welding mandrel 24 is set in rotation, resulting in heating of the contact surface between the valve base element 12 and the valve body 4 due to frictional heat. Further heating may also be provided using an additional induction heater.

FIG. 6 illustrates an end of a friction welding operation according to the invention. The valve base element 12 has been pressed into the valve body 4 after the particular metals have heated enough to achieve sufficient deformability. A friction weld expulsion is not illustrated here for the sake of clarity.

FIG. 7 illustrates a partial sectional view of the head of a valve 2 according to the invention. A protruding residual portion of the valve base element 12 has been removed in a machining operation, thus achieving an essentially flat valve base. The valve base element 12 is joined to the valve body 4 and the valve head 8 via the weld area or the heat influencing zone 20. A friction weld expulsion occurring on an outer side has likewise been removed. A friction weld expulsion extends at an inner side 20 or in the cavity 10. The friction weld expulsion 22 has been produced in the form of a cooling rib by use of suitable process parameters and an appropriate selection of material. This may likewise improve the heat transfer from the valve head 8 to a coolant (not illustrated) situated in the cavity 10.

FIG. 8 shows a partial perspective view of a valve 2 according to the invention. The valve stem 6 ends in the valve head 8. The opening in the cavity from FIG. 3 is closed by the valve base element 12. The engagement elements of the valve base element 12 from FIG. 2 have been removed. Only a portion of the borehole of the centering element 18 is still discernible at the base of the valve head. The weld area/heat influencing zone is indicated by dashed lines.

FIG. 9 illustrates a valve base element 12 that is mounted on a friction welding mandrel 24. The friction welding mandrel 24 is provided with structures that are complementary to the engagement element 16 of the valve base element 12 for transmitting a torque, and that are complementary to the centering element 18 of the valve base element 12. The shape of the engagement element/centering element determines how, and how much, torque can be transmitted, and whether the 16 [sic] valve base element 12 should or must be further clamped. Unlike the illustration, sawtooth-shaped flank toothing is preferred in order to allow the torque to be transmitted from the friction welding mandrel 24 to the valve base element 12, independently of an axial force component.

The invention claimed is:

1. A method for manufacturing an internally cooled valve, comprising providing a valve body having a valve stem that ends in a valve head, wherein the valve body has a cavity that is open toward the valve head, providing a valve base element, and closing the cavity with the valve base element by friction welding the valve base element to the valve head,
   wherein the valve base element and/or the valve body have/has an engagement structure with which the valve base element and/or the valve body are/is centrally clamped, and/or a torque is transmitted to the valve base element and/or to the valve body, and
   wherein the valve base element is fabricated as a green compact or brown compact by metal powder injection molding and sintered and wherein the valve base element is provided with a cooling rib structure and/or flow-influencing structure on a surface facing the cavity.

2. The method according to claim 1, wherein the friction welding is carried out as inductive friction welding.

3. The method according to claim 1, further comprising at least partially filling the cavity with a coolant before the cavity is closed by friction welding.

4. The method according to claim 3, wherein the coolant is selected from sodium or a sodium-containing coolant.

5. The method according to claim 1, wherein the engagement structure is subsequently removed and/or ablated.

6. The method according to claim 1, wherein the valve base element and the valve body have a welding surface contour, which in the friction welding operation produces a weld expulsion in the cavity in a desired shape of a cooling rib.

7. The method according to claim 6, wherein an outer portion of the weld expulsion is subsequently removed.

8. An internally cooled valve having a valve body that includes a valve head and a valve stem, the valve body having a cavity extending into the valve head the cavity being closed by a valve base that is joined to the valve head by friction welding,
   the valve base element and/or the valve body have/has an engagement structure with which the valve base element and/or the valve body may be centrally clamped, and a torque may be transmitted to the valve base element and/or to the valve body,
   the valve base element being provided with a cooling rib structure and/or flow-influencing on a surface facing the cavity, and
   wherein the valve base element is produced by sintering from a valve base element green compact or brown compact valve base element that is produced by metal powder injection molding.

9. The internally cooled valve according to claim 8, including a friction weld expulsion on an inner side of the cavity having the shape of a cooling rib which allows improved heat transfer from the valve head to the coolant.

10. The internally cooled valve according to one of claim 8, wherein the valve base element is produced by sintering.

* * * * *